United States Patent [19]

Moriguchi et al.

[11] 4,360,818
[45] Nov. 23, 1982

[54] HEAT-SENSITIVE RECORDING HEAD WITH MINIMUM NUMBER OF SWITCHING DIODES

[75] Inventors: Haruhiko Moriguchi; Takashi Ohmori, both of Ebina, Japan

[73] Assignee: Fuji Xerox Co., Ltd., Tokyo, Japan

[21] Appl. No.: 210,999

[22] Filed: Nov. 26, 1980

[30] Foreign Application Priority Data

Nov. 28, 1979 [JP] Japan .............................. 54-152889

[51] Int. Cl.³ .................... G01D 15/10; H05B 1/02
[52] U.S. Cl. .............................. 346/76 PH; 219/216
[58] Field of Search ..................... 346/76 PH; 219/216

[56] References Cited

U.S. PATENT DOCUMENTS 4,091,391  5/1978  Kozima et al. ................ 346/76 PH
4,216,481  8/1980  Hakoyama .................... 346/76 PH

*Primary Examiner*—George H. Miller, Jr.
*Attorney, Agent, or Firm*—Sughrue, Mion, Zinn, Macpeak & Seas

[57] ABSTRACT

A heat-sensitive recording head including an insulating substrate, an array of heat generating elements, a plurality of leads alternately arranged on both sides of the array of heat generating elements on the insulating substrate with the heat generating elements interposed between the leads. Lead wires are connected to predetermined ones of the leads either directly or through diodes. The lead wires are arranged in a matrix format and heat generating elements are coupled in blocks with the number of blocks being equal to half the number of common drive terminals provided. With the number of blocks represented by n, the average value of the resistances of the heat generating elements by $\bar{r}$, and the maximum variation of the resistances by $\pm r$, $$n < \tfrac{1}{2}\left(1 + \tfrac{2\bar{r}}{r}\right)$$

is established.

5 Claims, 8 Drawing Figures

HEAT-SENSITIVE RECORDING HEAD WITH MINIMUM NUMBER OF SWITCHING DIODES

BACKGROUND OF THE INVENTION

The present invention relates to a heat-sensitive recording head used in a facsimile printer or the like. More particularly, the invention relates to a matrix wiring arrangement in such a recording head.

In a conventional heat-sensitive recording head of the general type to which the invention pertains, especially in a recording head intended for line scanning, the drive leads correspond to the recording positions in the ratio of 1:1. That is, one drive lead is provided for each recording position. Because of this construction, the conventional recording head suffers from a problem that, when it is required to provide a head which is capable of carrying out recording operations with a high recording density and quality, it is difficult to connect the leads to the drive circuit because the distance between adjacent leads is considerably short.

In order to overcome the above-described difficulties, a heat-sensitive recording head as shown in FIG. 1 has been proposed in the art. In FIG. 1, reference numeral 1 designates a ceramic plate or substrate which is constructed by attaching a heat sink of aluminum or copper to a ceramic plate so as to provide excellent heat resistance characteristics and to provide a heat sink action. Reference numeral 2 designates a number of heat generating elements at different recording positions. The heat generating elements 2 are made of thin or thick film material or are fabricated by a semi-conductor technique. The surfaces of the heat generating elements 2 are covered by a protective layer of glass or the like in order to improve the wear resistance characteristic of the head. Further in FIG. 1, reference numerals 3 and 4 designate two lead groups which are composed of a number of leads $a_1$ through $a_n$ and a number of leads $b_1$ through $b_n$, respectively, which supply currents to the heat generating elements 2. The leads are arranged alternately on both sides of the heat generating elements 2 in such a manner that the array of heat generating elements 2 is divided into a number of segments, the size of which determines the recording density with the segments being located between the leads 3 and 4.

Because of the above-described arrangement, the heat-sensitive recording head of this type is termed an "alternate lead type" heat-sensitive recording head. As the recording head has a number of alternately arranged leads which act as common leads between adjacent recording positions, this device is advantageous in that the distance between terminals to be connected to the drive circuit, that is, the distance between adjacent leads, is twice the recording density and the alignment of the leads with the heat generating elements can be readily achieved.

As in the above-described conventional head, the head is provided with a plurality of heat generating elements and a matrix drive technique is employed therefor. Furthermore, as the heat response characteristic of the heat-sensitive recording head is relatively low, a number of heat generating resistors are generally provided and plural heat generating resistors are simultaneously driven. In addition, matrix wiring and reverse current blocking elements are provided for the heat-sensitive recording head. This will be described with reference to FIG. 2 in more detail.

In FIG. 2, reference numeral 1 designates a supporting substrate of aluminum or the like having high electrical and heat resistances, 2 heat generating elements, 3 common drive electrodes, 4 individual leads, 5 common drive leads, 6A and 6B reverse current blocking elements such as diodes, 7 matrix drive leads, 8 common drive terminals (or terminals B), and 9 individual lead terminals (or terminals A).

As shown in FIG. 2, the reverse current blocking elements 6A and 6B are connected to the leads 3 and 4, respectively. Accordingly, the number of reverse current blocking elements must be equal to at least the number of heat generating elements. Therefore, the reverse current blocking elements represent a considerably large part of the heat-sensitive recording head in both circuit elements and space as well as manufacturing cost. Furthermore, the number of connections between the reverse current blocking elements 6A and 6B and the leads is at least twice the total number of heat generating elements. The great number of connections inversely affects the reliability of the heat-sensitive recording head.

Accordingly an object of the present invention is to greatly reduce the total number of reverse current blocking elements compared with a conventional heat-sensitive recording head or to eliminate the reverse current blocking elements entirely thereby decreasing the manufacturing cost of the heat-sensitive recording head and to improve the reliability thereof.

SUMMARY OF THE INVENTION

In accordance with this, and other objects of the invention, there is provided a heat-sensitive recording head including an insulating substrate, an array of heat generating elements, a plurality of leads arranged on both sides of the array of heat generating elements on the insulating substrate with the heat generating elements being disposed between the leads, and a plurality of lead wires connected to the leads with the lead wires being arranged in matrix wiring form. The number of blocks is equal to half of the number of common drive terminals. With the number of blocks being represented by n, the average value of the resistances of the heat generating elements by $\bar{r}$, and the maximum variation of the resistances by $\pm \Delta r$, n, $\bar{r}$, and $\Delta r$ are set so as to satisfy $$n < \tfrac{1}{2}\left(1 + \frac{2\bar{r}}{\Delta r}\right).$$

Further, with m representing the number of individual lead terminals, it is preferred that n, m, $\Delta r$ and $\bar{r}$ be set to satisfy $$\frac{m}{(2n-1)(m-1)} > \frac{\Delta r}{\bar{r}}$$

where $m > 1$ and $\Delta r < \bar{r}$. In the structure, a plurality of common lead terminals are provided with predetermined ones of lead wires on a first side of the array being coupled to each of the common lead terminals and a plurality of individual lead terminals being provided for the other side of the array with predetermined ones of lead wires on the second side of the array being coupled to each of the individual lead terminals. The wires coupled to the common lead terminals are coupled to the leads and blocks with two lead wires provided for each of the blocks. Each of the lead wires is coupled to leads coupled to alternate ones of the heating elements.

DESCRIPTION OF THE PREFERRED EMBODIMENTS

Figure 3:
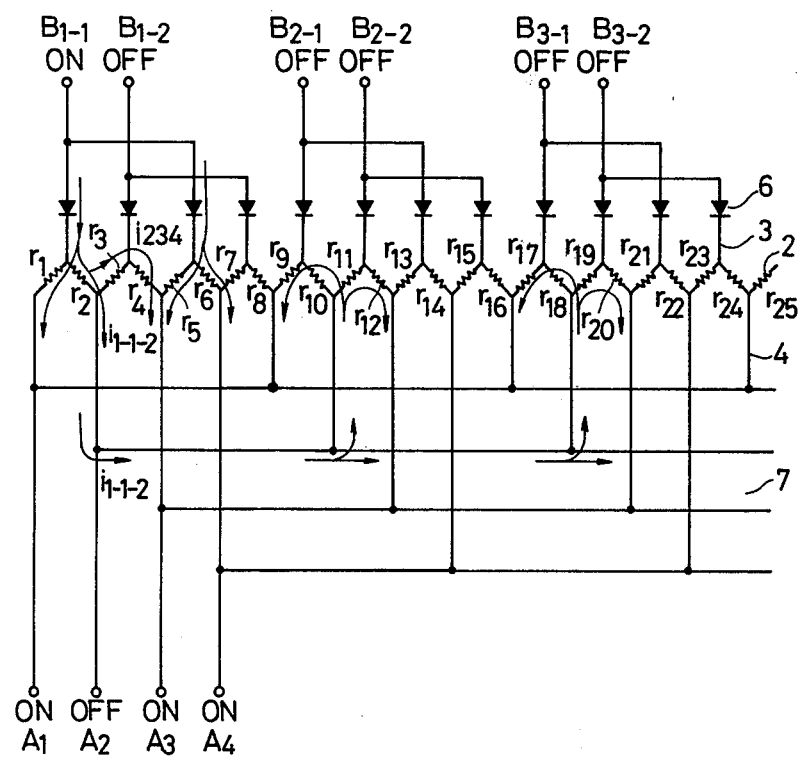
FIG. 3 is an explanatory diagram showing the arrangement of a preferred embodiment of a heat-sensitive recording head according to the invention in which no reverse current blocking elements are provided on the side of the individual drive leads of the head.

Referring now to FIG. 3 which is a schematic diagram of a preferred embodiment of a heat-sensitive recording head constructed according to the invention, the necessity of reverse current blocking elements will be described. It is assumed that a terminal $B_{1-1}$ is at a potential corresponding to an "ON" state, terminals $A_1$, $A_3$ and $A_4$ are also at a potential corresponding to the "ON" state, and a terminal $A_2$ is at a potential corresponding to an "OFF" state. Under these conditions, among the heat generating elements 2, those corresponding to positions $r_1$, $r_5$ and $r_6$ in FIG. 3 generate heat and that corresponding to a position $r_2$ generates no heat and accordingly does not color the recording sheet.

If no reverse current blocking elements are provided on the side of matrix drive leads 7 as shown in FIG. 3, then a current ($i_{1-1-2} + i_{234}$) flows in the heat generating element $r_2$. The current $i_{234}$ is a "sneak" current which is present even when the reverse current blocking elements are provided. The current $i_{1-1-2}$ flows to the terminals $A_1$ and $A_3$ through the heat generating elements $r_{10}$-$r_9$, $r_{11}$-$r_{12}$, $r_{18}$-$r_{17}$, $r_{19}$-$r_{20}$, . . . and so forth. Currents which flow from the side of the matrix drive leads 7 through the heat generating elements $r_{10}$, $r_9$, $r_{11}$, $r_{12}$ . . . are referred to as "reverse currents". As a current equal to the sum $i_{1-1-2}$ of these reverse currents and the sneak current $i_{234}$ flows in the heat generating element $r_2$, the latter generates heat.

With the number of blocks represented by n ($B_1$, $B_2$, . . . and $B_n$), and the number of terminals A is m ($A_1$, $A_2$, . . . and $A_m$), the resistance of the heat generating element is $r_i$, the current flowing in the resistance $r_i$ is $I_i$, and the voltage applied to the heat generating element is $V_r$, the following equations (1) and (2) are established for the circuit of FIG. 3:

$$I_i = \frac{V_r}{r_i} \text{ and} \tag{1}$$

$$i_{1-1-2} = \frac{V_r}{r_2 + R}, \tag{2}$$

where R is the collective resistance from $r_2$ to a terminal A with respect to the reverse current.

Assuming that the average resistance of the heat generating elements is denoted by $\bar{r}$, and $\bar{r} = r_{10} = r_9 = r_{11} = r_{12} = r_{17} = r_{18} = r_{19} = r_{20} = r_3 = r_4 = \ldots$, the following approximation can be made:

$$R = \frac{\bar{r}}{n - 1}. \tag{3}$$

Then, the current $i_2$ (including the sneak current) which flows through $r_2$ can be represented by the following equation (4):

$$i_2 = \frac{V_r}{r_2 + \frac{2\bar{r}}{2n - 1}}, \tag{4}$$

where $r_2 = i_{1-1-2} + i_{234}$. The amount of heat produced by each heat generating element is proportional to the electric power applied thereto. Therefore, if the amounts of heat produced by the heat generating elements $r_1$ and $r_2$ are denoted by $Q_1$ and $Q_2$, respectively, then the following relations (5) and (6) can be written:

$$Q_1 \propto \frac{V_r^2}{r_1} \text{ and} \tag{5}$$

$$Q_2 \propto \frac{V_r^2}{\left(r_2 + \frac{2\bar{r}}{2n - 1}\right)^2} \cdot r_2. \tag{6}$$

If $r_1 = r_2 = \bar{r}$, then the following equation (7) can be established because the proportional constants of the expressions (5) and (6) are substantially equal.

$$Q_2 = \left(\frac{2n - 1}{2n + 1}\right)^2 Q_1. \tag{7}$$

Accordingly, the recording sheet is colored at the position $r_2$, which should be left white, although the coloring density is lower than that at the position $r_1$.

It can be readily understood that, of the cases where the reverse currents are present, the case where the current is the largest corresponds to the example shown in FIG. 3.

For instance, when the terminal $A_1$ is at the "ON" state potential and the remaining terminals $A_2$, $A_3$ and $A_4$ are at the "OFF" state potential, the reverse current is $$\frac{V_r}{r_2 + \frac{2\bar{r}}{n-1}}$$

which is about $$\frac{(2n+1)(n-1)}{(2n-1)(n+1)}$$

times $i_{1\text{-}1\text{-}2}$, that is, smaller than $i_{1\text{-}1\text{-}2}$.

For simplification of description, the case where only the reverse current blocking elements on the side of the matrix drive leads are removed has been described. Similarly, in the case where the reverse current blocking elements on the side of the common drive leads are removed or in the case where all the reverse current blocking elements are removed, the heat generating elements not selected may still generate heat because of the reverse currents or the sneak currents.

As is apparent from the equation (7), the ratio of $Q_2$ to $Q_1$ is a function of the number n of matrix-divided blocks. In practice, $r_i \neq r_j$. Expressions (5) and (6) will be discussed further with this assumption.

First, it is assumed that a heat generating element $r_l$ generates heat in response to an input signal applied to a common drive terminal $B_{i\text{-}j}$ and an individual lead terminal $A_k$ to cause thermal recording and it is further assumed that the resistance of the heat generating element is as defined by the following expression (8):

$$\bar{r} - \Delta r \leq r_l \leq \bar{r} + \Delta r. \tag{8}$$

If, under this condition, there is no reverse current, the amount of heat $Q_l$ generated is in a range as defined by the following expression (9):

$$\frac{kV_r^2}{\bar{r} + \Delta r} \leq Q_l < \frac{kV_r^2}{\bar{r} - \Delta r}, \tag{9}$$

where k is a constant.

It is well known in the art that the coloring density of a heat-sensitive recording sheet is determined by the amount of heat produced by a heat generating element. This is indicated by the characteristic curve shown in FIG. 4.

The normal amount of heat provided by a heat generating element (with no reverse current present) can be readily controlled by adjusting both the voltage $V_r$ applied to the head and the period of time during which the voltage $V_r$ is applied thereto to. On the other hand, generally the heat generating elements of a heat-sensitive recording head do not have uniform resistances and, accordingly, the amounts of heat produced by the heat generating elements are also not uniform. Therefore, it is necessary to prevent non-uniform recording density due to non-uniform heating. This requirement can be satisfied by setting the above-described voltage $V_r$ and the voltage application time in the range in which, as is clear from the characteristic curve of FIG. 4, the coloring density is substantially maintained unchanged between $Q_{lmin}$ and $Q_{lmax}$.

Thus, in the case where, as in the expression (6), the amount of heat $Q_2$ due to the reverse current and the sneak current can be set so as not to exceed the minimum value of $Q_l$, the image quality is not perceptably affected even in the presence of reverse current.

The maximum amount of heat produced corresponding to variations in the reverse currents and sneak currents attributed to non-uniform resistances of the heat generating elements and the minimum value of $Q_l$ will be discussed. If $r_2 = \bar{r} - \Delta r$ in the expression (6), then the following expression (10) can be written:

$$Q_{2max} \propto \frac{V_r^2}{\left((\bar{r} - \Delta r) + \frac{2\bar{r}}{2n-1}\right)^2} \times (\bar{r} - \Delta r). \tag{10}$$

From the expression (9), the following expression (11) can be obtained:

$$Q_{lmin} \propto \frac{V_r^2}{\bar{r} + \Delta r}. \tag{11}$$

Since the proportional constant of the expression (10) is equal to that of the expression (11), the condition for $Q_{2max} < Q_{lmin}$ is:

$$\frac{V_r^2}{\left((\bar{r} - r) + \frac{2\bar{r}}{2n-1}\right)^2}(\bar{r} - \Delta r) < \frac{V_r^2}{\bar{r} + \Delta r}.$$

If an approximation of $$\sqrt{\bar{r}^2 - \Delta r^2} = \bar{r}$$

is made, then $$n < \frac{1}{2}\left(1 + \frac{2\bar{r}}{\Delta r}\right), \tag{12}$$

where $\Delta r < \bar{r}$.

Figure 4:
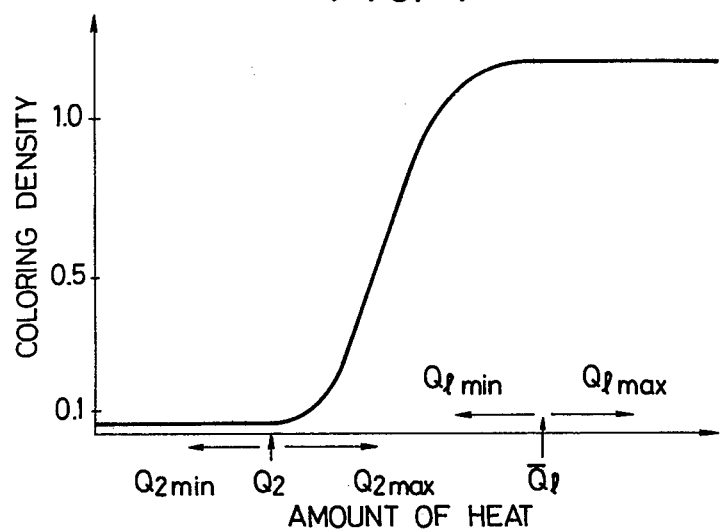
FIG. 4 is a graphical representation indicating the relation between the amount of heat produced by a heat generating element and the coloring density of a recording sheet.

As is clear from the above description, if, even under the worst condition that all the reverse current blocking elements on the side of the matrix drive leads 7 are eliminated so that the reverse currents and sneak currents cause heat generating elements not selected to generate heat, if the fluctuation in resistance of the heat generating elements and the number of matrix-divided blocks are so selected as to satisfy the expression (12) and the applied voltage and the voltage application time are set to values as indicated by $Q_l$ in FIG. 4, then unwanted thermal recording due to the heat generation of the heat generating elements not selected is prevented and, accordingly, the recorded image is satisfactory in quality and contrast.

Figure 5:
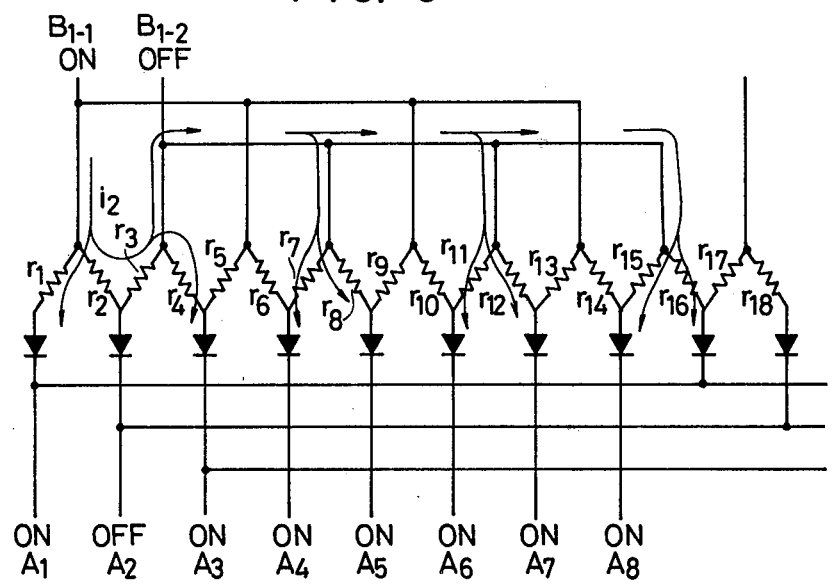
FIG. 5 is an explanatory diagram showing another embodiment of a heat-sensitive recording head in which no reverse current blocking elements are provided on the side of the common drive leads of the head.
Figure 6:
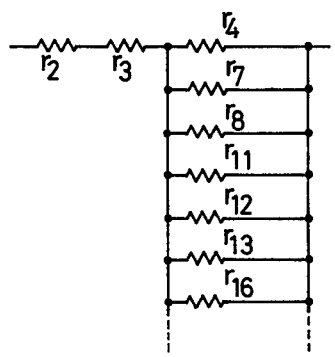
FIG. 6 is an equivalent circuit of heat generating elements in the recording head of FIG. 5.

In another embodiment of a heat-sensitive recording head according to the invention, the reverse current blocking elements are provided only on the side of the matrix drive leads, unlike the above-described example. In this embodiment, the sneak current flows as shown in FIG. 5. The flow path of the sneak current $i_2$ is equivalent to a circuit shown in FIG. 6. The composite resistance R of the circuit in FIG. 6 is:

$$R = r_2 + r_3 + \frac{1}{\Sigma(1/r_i)} = r_2 + \bar{r} + \frac{\bar{r}}{7} = r_2 + \frac{8}{7}\bar{r}. \tag{13}$$

With the number of individual lead terminals represented by m, the following equation (14) can be written:

$$R = r_2 + \frac{m}{m-1} \bar{r} \tag{14}$$

Therefore, the following equation (15) is obtained:

$$i_2 = \frac{V_r}{r_2 + \frac{m}{m-1} \bar{r}} \tag{15}$$

With the average value of the resistances of the heat generating elements being $\bar{r}$ and the variation of the resistances $\pm \Delta r$, $$Q_{2max} = \left( \frac{V_r}{\bar{r} - \Delta r + \frac{m}{m-1} \bar{r}} \right)^2 \cdot (\bar{r} - \Delta r) \text{ and}$$

$$Q_{lmin} = \frac{V_r^2}{\bar{r} + \Delta r}.$$

In order to satisfy $Q_{2max} < Q_{lmin}$, the following relationship (16) must be established:

$$\frac{\bar{r} - \Delta r}{\left( \frac{2m-1}{m-1} \bar{r} - \Delta r \right)^2} < \frac{1}{\bar{r} + \Delta r}. \tag{16}$$

Under the normal conditions, the following expression (17) is established. Therefore, the inequality (16) can be rewritten into the following inequality (18):

$$\bar{r} - \Delta r > 0 \tag{17}$$

$$\left( \frac{2m-1}{m-1} \bar{r} - \Delta r \right)^2 > \bar{r}^2 - \Delta r^2 \tag{18}$$

By rearranging the inequality (18), the expression (19) is obtained:

$$\bar{r}^2 - A\bar{r} \cdot \Delta r + \frac{A^2 - 1}{2} \times \bar{r}^2 > 0, \tag{19}$$

where $$A = \frac{2m-1}{m-1}.$$

This inequality (19) holds true irrespective of the value of $\Delta r / \bar{r}$ when $$\frac{2m-1}{m-1} > 2\sqrt{0.5}.$$

On the other hand, if $m > 1$, then at all times:

$$\frac{2m-1}{m-1} = 1 + \frac{m}{m-1} > 1.$$

Consequently, when $m > 1$ and the inequality (17) is satisfied, that is, when $\bar{r} > \Delta r$, $Q_{2max} < Q_{lmin}$ is satisfied. Accordingly, degradation of the quality and contrast of a recorded image is prevented.

Figure 7:
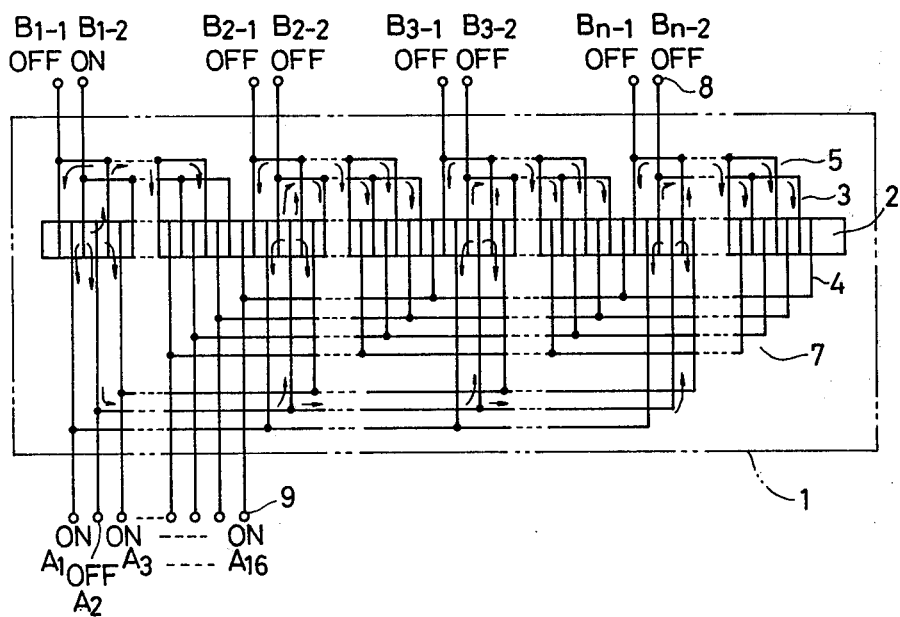
FIG. 7 is an explanatory diagram showing the arrangement of another embodiment of a heat-sensitive recording head of the invention in which no reverse current blocking elements are provided.
Figure 8:
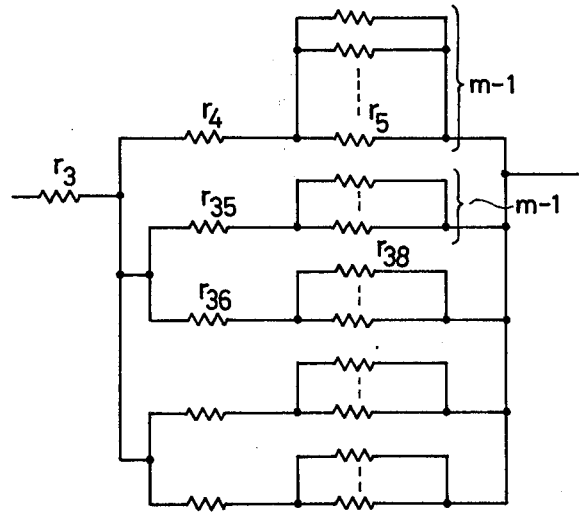
FIG. 8 is an equivalent circuit of the heat generating elements in the recording head in FIG. 7.

FIG. 7 shows another embodiment of a heat-sensitive recording head according to the invention in which the above-described reverse current blocking elements are provided on neither of the sides of the array of heat generating elements. This embodiment too operates as described above. In this case, the circuit through which the sneak and reverse currents flow is as shown in FIG. 8. The composite resistance R is represented by the following equation (20):

$$R = r_3 + \frac{m\bar{r}}{(2n-1)(m-1)} \tag{20}$$

where it is assumed that:

$$\frac{1}{\sum_{i}^{k} \left( \frac{1}{r_i} \right)} = \frac{\bar{r}}{k} \text{ and } \frac{1}{\sum_{j}^{l} \left( r_j + \frac{\bar{r}}{k} \right)} = \frac{\bar{r} + \frac{\bar{r}}{k}}{l}.$$

If the amount of heat produced by the heat generating element $r_3$ due to the sneak and reverse current is represented by $Q_2$ and, when the element $r_3$ is selected, the amount of heat produced thereby is represented by $Q_l$, $Q_{2max} < Q_{lmin}$ must be satisfied. $Q_{2max}$ and $Q_{lmin}$ can be defined by the following expressions (21) and (22), respectively:

$$Q_{2max} \propto \left( \frac{V_r}{\bar{r} - \Delta r + \frac{m\bar{r}}{(2n-1)(m-1)}} \right)^2 (\bar{r} - \Delta r) \text{ and} \tag{21}$$

$$Q_{lmin} \propto \frac{V_r^2}{\bar{r} + \Delta r}. \tag{22}$$

Therefore, with $\Delta r < \bar{r}$, $$\frac{1}{\left( \bar{r} - \Delta r + \frac{m\bar{r}}{(2n-1)(m-1)} \right)^2} < \frac{1}{\bar{r}^2 - \Delta r^2} \text{ and}$$

$$\bar{r} - \Delta r + \frac{m\bar{r}}{(2n-1)(m-1)} > \sqrt{\bar{r}^2 - \Delta r^2} \simeq \bar{r}.$$

Accordingly, the following expression (23) is obtained:

$$\frac{m}{(2n-1)(m-1)} > \frac{\Delta r}{\bar{r}} \tag{23}$$

As may be readily appreciated at this point, the reverse current blocking elements can be eliminated from the heat-sensitive recording head by setting the values n, m and $\Delta r / \bar{r}$ so as to satisfy the expression (23). The heat-sensitive recording head thus modified is simple to construct, has a high reliability and a low manufacturing cost.

Figure 1:
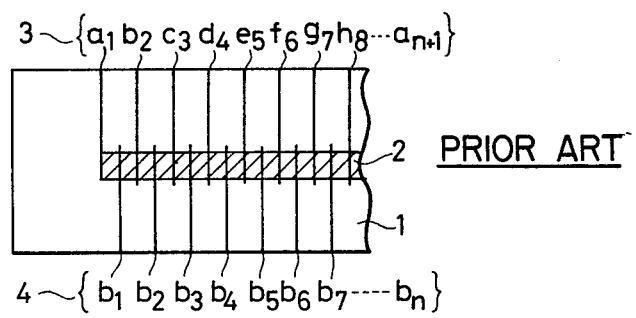
FIG. 1 is a plan view of a heat-sensitive recording head to which the invention is applied.
Figure 2:
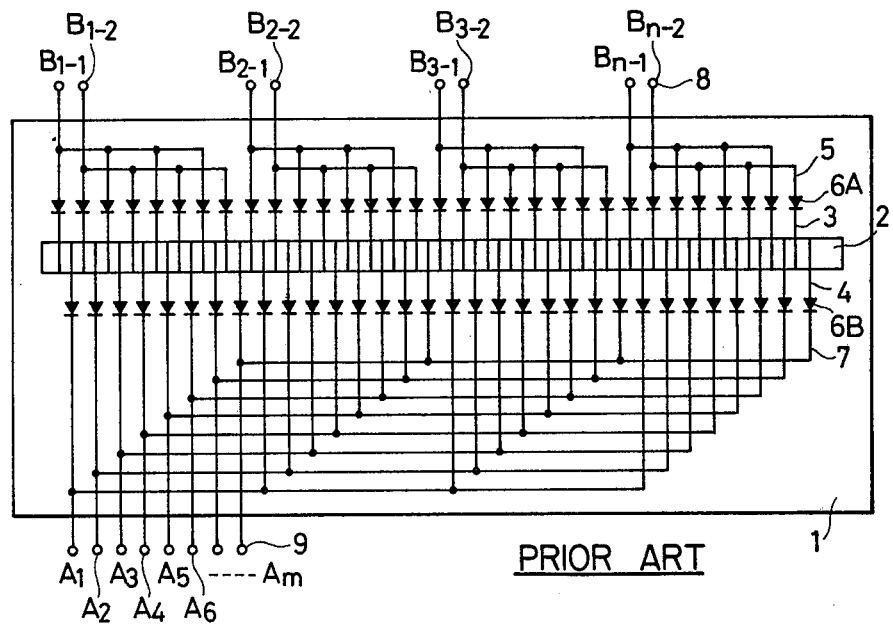
FIG. 2 is an explanatory diagram showing the arrangement of a conventional heat-sensitive recording head.

As is apparent from a comparison of the circuit of FIG. 2 with that of FIG. 7, a specific feature of the embodiment shown in FIG. 7 is that no reverse current blocking elements are connected to the individual leads 4 or the common drive electrodes 3. The head of FIG. 7 is similar to that of FIG. 2 with the exception of this specific feature. In these embodiments, the matrix arrangement is of $n \times 16$ (the number of blocks being n and the number of individual lead terminals being $m = 16$) and the relation between the average value $\bar{r}$ of the resistances of the heat generating elements and the permitted variations $\pm\Delta r$ thereof is $\Delta r<0.293\bar{r}$.

With this arrangement, the applied voltage and the voltage application period can be set so that the expression (23) is satisfied and the quality of the image formed is satisfactory, that is, so that $Q_{lmin}$ is near the critical point at which the coloring density curve in FIG. 4 is saturated.

In general, the variation in resistance of the heat generating elements is $\pm 20\%$ at most. Therefore, the above-described embodiments can be readily implemented. If the variation $\Delta r$ is within $\pm 20\%$, the matrix arrangement $(2n \times m)$ may be so designated that the number of blocks (n) is equal to or smaller than 3 ($n \leq 3$) and the number of individual lead terminals (m) is larger than 1 ($m > 1$).

As is clear from the above description, the effect of the reverse current is decreased as the number of blocks is reduced. In the future, heat generating elements may be so improved that they can be driven at higher speeds with lower power so that recording can be accomplished at higher speed. In this case, it is necessary to reduce the number of blocks. For this purpose, the invention is especially effective.

As described above, in a heat-sensitive recording head in which leads are alternately arranged on both sides of an array of heat generating elements with the heat generating elements interposed between the leads and lead wires connected to the leads are arranged in matrix form and in common drive form, according to the invention, with the number of matrix-divided blocks represented by n, the number of individual lead terminals represented by m, and the variation in resistance of the heat generating elements represented by ($\bar{r}\pm\Delta r$) where $\bar{r}$ is the average value of the resistances of the heat generating elements, the variation of resistance and the matrix division are set so as to satisfy the following expression:

$$\frac{m}{(2n - 1)(m - 1)} > \frac{\Delta r}{\bar{r}},$$

where $m > 1$ and $\Delta r < \bar{r}$.

Thus, with the use of the invention, it is possible to completely eliminate the reverse current blocking elements from the conventional heat-sensitive recording head. Accordingly, the heat-sensitive recording head of the invention has a variety of merits in that it has a low manufacturing cost, high reliability and small size and it can be readily manufactured compared with a conventional heat-sensitive recording head.

Furthermore, the reverse currents and the sneak currents are advantageously used in the heat-sensitive recording head of the invention to provide a preliminary heating of the recording head to the extent that the recording sheet is not colored. Accordingly, the recording head of the invention can be driven at a higher speed than a conventional lead.

What is claimed is:

1. A heat-sensitive recording head comprising:
an insulating substrate;
an array of heat generating elements;
a plurality of leads alternately arranged on both sides of said array of heat generating elements on said insulating substrate with said heat generating elements interposed between said leads;
a plurality of lead wires connected to predetermined ones of said leads, a plurality of common lead terminals, and a plurality of individual lead terminals, said lead wires being arranged in matrix wiring form, predetermined ones of said lead wires on a first side of said array being coupled to corresponding ones of said common lead terminals, said lead wires coupled to said common lead terminals being coupled to said leads in blocks with two lead wires provided for each of said blocks, each of said lead wires coupled to said common lead terminals being coupled to leads coupled to alternate ones of said heating elements, predetermined ones of said lead wires on a second side of said array being coupled directly between corresponding ones of said individual lead terminals and said leads on said second side of said array; and
wherein, with the number of said blocks being represented by n, the average value of the resistances of said heat generating elements being represented by $\bar{r}$, and the maximum variation of of said resistances being represented by $\pm\Delta r$, said values n, $\bar{r}$ and $\Delta r$ are set so as to satisfy:

$$n < \tfrac{1}{2}\left(1 + \frac{2\bar{r}}{\Delta r}\right).$$

2. The head-sensitive recording head of claim 1 further comprising a plurality of diodes, one of said diodes being coupled between each of said leads on said second side of said array and the corresponding individual terminal.

3. A heat-sensitive recording head comprising:
an insulating substrate;
an array of heat generating elements;
a plurality of leads alternately arranged on both sides of said array of heat generating elements on said insulating substrate with said heat generating elements interposed between said leads;
a plurality of lead wires connected directly to predetermined ones of said leads, said lead wires being arranged in matrix wiring form including a plurality of common lead terminals with predetermined ones of said lead wires on a first side of said array being coupled directly to each of said common lead terminals and further including a plurality of individual lead terminals with predetermined ones of said lead wires on a second side of said array being coupled directly to each of said individual lead terminals, said lead wires coupled to said common lead terminals being coupled to said leads in blocks with two lead wires provided for each of said blocks, each of said lead wires being coupled to leads coupled to alternate ones of said heating elements; and
wherein, with the number of blocks being represented by n, the number of individual lead terminals being represented by m, the average value of the resistances of said heat generating elements being represented by $\bar{r}$, and the maximum variation of said resistances being represented by $\pm\Delta r$, said values n, m, $\Delta r$ and $\bar{r}$ are set to satisfy:

$$\frac{m}{(2n - 1)(m - 1)} > \frac{\Delta r}{\bar{r}},$$

where $m > 1$ and $\Delta r < r$.

4. A heat-sensitive recording head comprising:

an insulating substrate;
an array of heat generating elements;
a plurality of leads alternately arranged on both sides of said array of heat generating elements on said insulating substrate with said heat generating elements interposed between said leads;
a plurality of lead wires connected to predetermined ones of said leads, a plurality of common lead terminals, and a plurality of individual lead terminals, said lead wires being arranged in matrix wiring form, predetermined ones of said lead wires on a first side of array being coupled directly to corresponding ones of said common lead terminals, said lead wires coupled to said common lead terminals being coupled directly to said leads in blocks with two lead wires provided for each of said blocks, each of said lead wires coupled to said common lead terminals being coupled directly to leads coupled to alternate ones of said heating elements, predetermined ones of said lead wires on a second side of said array being coupled between corresponding ones of said individual lead terminals and said leads on said second side of said array; and wherein, with the average value of the resistances of said heat generating elements being represented by $\bar{r}$ and the maximum variation of said resistances being represented by $\pm \Delta r$, said values $\bar{r}$ and $\Delta$ are set so as to satisfy: $\bar{r} > \Delta r$.

5. The heat-sensitive recording head of claim 4 further comprising a plurality of diodes, one of said diodes being coupled between a corresponding one of said leads on said second side of said array and the corresponding one of said individual lead terminals.

* * * * *